United States Patent
Chen et al.

(10) Patent No.: US 12,124,069 B1
(45) Date of Patent: Oct. 22, 2024

(54) OPTICAL WAVEGUIDE AND DISPLAY DEVICE

(71) Applicant: Jiaxing UPhoton Optoelectronics Technology Co., Ltd., Jiaxing (CN)

(72) Inventors: Peng Chen, Jiaxing (CN); Lei Sui, Jiaxing (CN); Kehan Tian, Jiaxing (CN)

(73) Assignee: Jiaxing UPhoton Optoelectronics Technology Co., Ltd., Tongxiang (CN)

( * ) Notice: Subject to any disclaimer, the term of this patent is extended or adjusted under 35 U.S.C. 154(b) by 0 days.

(21) Appl. No.: 18/666,213

(22) Filed: May 16, 2024

(30) Foreign Application Priority Data

May 19, 2023 (CN) .................. 202310565756.X

(51) Int. Cl.
*F21V 8/00* (2006.01)
*G02B 6/42* (2006.01)
*G03H 1/00* (2006.01)

(52) U.S. Cl.
CPC ......... *G02B 6/0026* (2013.01); *G02B 6/4204* (2013.01); *G03H 2001/0088* (2013.01)

(58) Field of Classification Search
None
See application file for complete search history.

(56) References Cited

U.S. PATENT DOCUMENTS

2019/0227321 A1\* 7/2019 Lee .................. G02B 27/0101

FOREIGN PATENT DOCUMENTS

| CN | 1774661 A | 5/2006 |
|---|---|---|
| CN | 102147492 A | 8/2011 |
| CN | 107466372 A | 12/2017 |
| CN | 207502834 U | 6/2018 |
| CN | 109073889 A | 12/2018 |
| CN | 212647164 U | 3/2021 |

(Continued)

OTHER PUBLICATIONS

Castro et al., Demonstration of mode conversion using anti-symmetric waveguide Bragg gratings, Optics Express vol. 13, No. 11 (May 30, 2005) pp. 4180-4184. See CN Search Report for relevance.

(Continued)

*Primary Examiner* — Christopher Braniff
(74) *Attorney, Agent, or Firm* — Renner, Kenner, Greive, Bobak, Taylor & Weber

(57) ABSTRACT

An optical waveguide and a display device are provided. The optical waveguide includes a waveguide substrate causing light to propagate within it through total internal reflection and at least one grating disposed between and inclined with respect to the first and second surfaces of the waveguide substrate for transmitting and reflecting incident light or for transmitting and diffractively deflecting incident light. The transmitted light is coupled into the waveguide substrate to propagate within it through total internal reflection, and the reflected or diffractively deflected light is coupled out from the waveguide substrate. The grating is configured such that the reflection efficiency or diffraction deflection efficiency when an incidence angle is less than a first angle and greater than a fourth angle is greater than that when the incidence angle is greater than the first angle, wherein the first angle is greater than the fourth angle.

26 Claims, 5 Drawing Sheets

(56) References Cited

FOREIGN PATENT DOCUMENTS

CN    112859334 A    5/2021
CN    114051587 A    2/2022

OTHER PUBLICATIONS

Minghuan Liu et al., Fabrication of slanted liquid crystal/polymer volume grating applied to augmented reality, Chinese Journal of Liquid Crystals and Displays, vol. 35, No. 10 (Oct. 31, 2020). See CN Search Report for relevance.
Tingting Lu, Study on holographic optical elements applied to near eye display, Electronic Journal of Master Degrees, (Feb. 15, 2022). See CN Search Report for relevance.
Chinese Notification to Go through Formalities of Registration and Notice of Grant of Right for Invention (with Chinese Search Report) and English translation thereof.

* cited by examiner

OPTICAL WAVEGUIDE AND DISPLAY DEVICE

CROSS-REFERENCE TO RELATED APPLICATION

The present application claims priority to Chinese Patent Application No. 202310565756X, filed on May 19, 2023, which is hereby incorporated by reference in its entirety.

BACKGROUND

The present application generally relates to the technical field of optics, and more specifically to an optical waveguide and a display device having the same.

With the development of science and technology, Augmented Reality (AR) technology, as a very intelligent and portable display technology, is slowly moving towards the public. Its main feature is that virtual images are superimposed on a real scene, such that people can watch the real scene while watching the virtual images. It is precisely because of the above characteristics of AR display that the technology is currently more and more widely used in security, education, medical, military, industrial, entertainment and other industries.

AR glasses are one of the important mediums in the field of augmented reality display. The optical waveguide has the advantages of allowing production with high ability for mass production and a light, thin form, and is gradually approved in the field of AR display, being expected to become the mainstream technology development direction of AR field in the future.

The existing optical waveguide solutions are roughly divided into two categories, one is geometric optical waveguide, and the other is diffractive optical waveguide.

The main implementation of the geometric optical waveguide is geometric array optical waveguide, which is mainly composed of a series of semi-transparent and semi-reflective mirrors, wherein the mirrors are surfaces embedded in a glass substrate and form a specific angle with the transmitted light. Each mirror will reflect part of the light out of the waveguide into the human eye. At present, the mirror is mainly implemented by multilayer film, the multilayer film system of each mirror needs to be carefully designed, and the number of film layers usually reaches dozens of pieces.

In the diffractive optical waveguide, in order to achieve a larger FOV (Field of View), better non-uniformity and higher efficiency at the same time, it is typically needed that the coupling-out grating may be designed to have a certain two-dimensional grating region, and a certain one-dimensional grating region on the sides of the two-dimensional grating region to improve the efficiency. However, there is a large difference in coupling-out efficiency between the one-dimensional and two-dimensional regions, and the factor of the difference typically may be more than 3 times, and even reach more than 6 times. This leads to the problem that the coupling-out strength of the two-dimensional region in the middle and the one-dimensional region on its sides are quite different, resulting in clear demarcation for bright to dark to bright areas, which is undesired to the non-uniformity index, and is also undesired for viewing by human eyes.

Therefore, it is necessary to improve the optical waveguide and display device to solve at least one technical problem.

SUMMARY

A series of simplified concepts are introduced into the portion of Summary of the present application, which would be further described in the portion of Detailed Description section. The Summary of the present application does not mean attempting to define the key features and essential technical features of the claimed technical solution, let alone determining the protection scope thereof.

To at least partially solve the above problems, a first aspect of the present application provides an optical waveguide comprising a waveguide substrate and at least one grating. The waveguide substrate has a first surface and a second surface oppositely disposed for totally reflecting light entering the inside of the waveguide substrate and causing the light to propagate within the waveguide substrate through total internal reflection. The at least one grating is disposed in the waveguide substrate and located between and inclined with respect to the first surface and the second surface for transmitting and reflecting incident light or for transmitting and diffractively deflecting incident light. Wherein the transmitted light is coupled into the waveguide substrate to propagate within the waveguide substrate through total internal reflection, and the reflected or diffractively deflected light is coupled out from the waveguide substrate. The grating is configured such that when incidence angles of the incident light on the grating are different, reflection efficiencies or diffraction deflection efficiencies of the grating are different, and the reflection efficiency when the incidence angle is less than a first angle and greater than a fourth angle is greater than the reflection efficiency when the incidence angle is greater than the first angle, or the diffraction deflection efficiency when the incidence angle is less than the first angle and greater than the fourth angle is greater than the diffraction deflection efficiency when the incidence angle is greater than the first angle. Wherein the first angle is greater than the fourth angle.

The optical waveguide according to the present application includes at least one grating disposed in the waveguide substrate, which may transmit and reflect incident light or transmit and diffractively deflect incident light, thereby realizing a semi-reflective and semi-transparent optical function, simple and flexible design, and easy processing. Wherein the reflected light (the diffraction deflected light) is used for human observation, and the reflected light (the diffraction deflected light) may be made to have higher brightness by setting a smaller incidence angle so as to improve user experience.

Optionally, the grating is configured such that the reflection efficiency when the incidence angle is less than or equal to a second angle and greater than or equal to a third angle is more than three times the reflection efficiency when the incidence angle is greater than the first angle; or the diffraction deflection efficiency when the incident angle is less than or equal to the second angle and greater than or equal to the third angle is more than three times the diffraction deflection efficiency when the incidence angle is greater than the first angle. Wherein the second angle is less than or equal to the first angle and greater than the fourth angle, and the third angle is less than the second angle and greater than or equal to the fourth angle.

According to the present application, the reflection efficiency of the incidence angle within a certain range is significantly higher than that of the incidence angle outside the range, or the diffraction deflection efficiency of the incidence angle within a certain range is significantly higher than that of the incidence angle outside the range.

Optionally, the grating is configured such that when the incidence angle is less than or equal to the second angle and greater than or equal to the third angle, a fluctuation coefficient $s1$ of the reflection efficiency or of the diffraction deflection efficiency is less than or equal to 0.33. Wherein the fluctuation coefficient s1 is calculated according to the following formula:

$$s1=(R_{max}-R_{min})/(R_{max}+R_{min})$$

Wherein $R_{max}$ is a maximum value of the reflection efficiency when the incidence angle is less than or equal to the second angle and greater than or equal to the third angle, $R_{min}$ is a minimum value of the reflection efficiency when the incidence angle is less than or equal to the second angle and greater than or equal to the third angle; or $R_{max}$ is a maximum value of the diffraction deflection efficiency when the incidence angle is less than or equal to the second angle and greater than or equal to the third angle, and $R_{min}$ is a minimum value of the diffraction deflection efficiency when the incidence angle is less than or equal to the second angle and greater than or equal to the third angle.

According to the present application, when the incidence angle is within a certain range (less than or equal to the second angle and greater than or equal to the third angle), the grating has high and uniform reflection efficiency or the diffraction deflection efficiency.

Optionally, the difference between the third angle and the second angle is greater than 10°.

According to the present application, the variation range of the incidence angle corresponding to the effect that the grating has the high and uniform reflection efficiency or diffraction deflection efficiency is greater than 10°. When the refractive index of the waveguide substrate is certain, the field of view FOV has a larger range.

Optionally, the first angle is 30° to 35°.

According to the present application, when the incidence angle is below 30° to 35°, the reflected light has higher brightness.

Optionally, the optical waveguide comprises a plurality of the gratings.

According to the present application, the plurality of the gratings may successively reflect incident light, thereby increasing the illuminated area of emitted light and improving user experience.

Optionally, the number of the gratings is N, and N is an integer greater than 1. The N gratings are numbered sequentially according to the direction of an optical path, and the reflection efficiency of the grating with the subsequent number is greater than the reflection efficiency of the grating with the previous number, or the diffraction deflection efficiency of the grating with the subsequent number is greater than the diffraction deflection efficiency of the grating with the previous number.

Optionally, a $k^{th}$ said grating has reflection efficiency $R_k$ and transmission efficiency $T_k$ or the $k^{th}$ said grating has diffraction deflection efficiency $R_k$ and transmission efficiency $T_k$, and k is an integer greater than or equal to 1 and less than or equal to N. Each of the gratings has respective efficiency coefficient s2. Wherein the efficiency coefficient $s2_i$ of light beam reaching an $i^{th}$ said grating is calculated according to the following formula:

$$s2_i = R_i \prod_{j=1}^{i-1} T_j$$

Wherein i is an integer greater than 1 and less than or equal to N, j is an integer, and the efficiency coefficient $s2_1$ of a first said grating is its reflection efficiency or diffraction deflection efficiency $R_1$. The optical waveguide is configured such that a quotient of the difference between the maximum the minimum values of the N efficiency coefficients s2 divided by the sum of the maximum the minimum values of the N efficiency coefficients s2 is less than or equal to 0.33.

According to the present application, the set of the reflection efficiency or diffraction deflection efficiency of each grating may make the uniformity of the emitted light intensity in the field of view better.

Optionally, the plurality of the gratings are substantially parallel to each other and/or distributed at substantially equal intervals.

According to the present application, the plurality of the gratings are substantially parallel to each other and/or distributed at substantially equal intervals, which is beneficial to form an emitted light field with uniform brightness.

Optionally, the grating is constructed as a volume holographic grating having an equal refractive index fringe surface. Wherein a reflecting mirror surface is the equal refractive index fringe surface.

According to the present application, the semi-reflective and semi-transparent functions, simple and flexible design, and easy processing are realized by modulating the refractive index inside the volume holographic grating.

Optionally, the volume holographic grating has a thickness of 1 to 20 microns, and/or the volume holographic grating has an amplitude of refractive index modulation of 0.01 to 0.2.

According to the present application, the volume holographic grating has a smaller thickness and a wider angular spectrum width, and the reflection efficiency or diffraction deflection efficiency of the grating may be adjusted through the amplitude of refractive index modulation.

Optionally, an included angle between the volume holographic grating and the first surface or the second surface is 20° to 30°, and/or the volume holographic grating has a grating period of 2000 to 7000 lp/mm.

According to the present application, the volume holographic grating may be flexibly designed.

Optionally, a thickness direction of the volume holographic grating is parallel to or perpendicular to the equal refractive index fringe surface, and/or the volume holographic grating includes a photosensitive material with an average refractive index of 1.5 to 2.0.

According to the present application, the thickness direction of the volume holographic grating is parallel to or perpendicular to the equal refractive index fringe surface, which can simplify design and processing. In the case of the same optical-mechanical FOV, the selection of a waveguide material with a larger refractive index is beneficial to improve the efficiency uniformity in the field of view.

Optionally, each of the volume holographic gratings is configured to have a nonuniformly distributed amplitude of refractive index modulation.

Optionally, each of the volume holographic gratings is configured such that the amplitude of refractive index modulation at both ends is less than that in the middle part.

Optionally, the volume holographic grating is constructed as an apodized volume holographic grating.

Specifically, each of the volume holographic gratings is configured to have the following refractive index modulation distribution n(x,z):

$$n(x,z)=n_0+n_1(x,z)\cdot\cos[\boldsymbol{K}\ (x\sin\phi+z\cos\phi)],$$

wherein $$n_1(x,z)=n_m \cdot \text{sin } c[2(z-d/2)/d], \text{ or}$$

$$n_1(x,z)=n_m \cdot \exp[-(z-d/2)^2],$$

wherein x is a coordinate along the direction of a surface of the volume holographic grating, z is a coordinate along a thickness direction of the volume holographic grating, $n_0$ is an average refractive index of material of the volume holographic grating, $n_m$ is a preset constant, $\phi$ is an inclination angle of the volume holographic grating, $K$ is a grating vector of the volume holographic grating determined according to Bragg condition, and the equal refractive index fringe surface is perpendicular to the grating vector $K$.

According to the present application, the set of the non-uniformly distributed amplitude of refractive index modulation or the apodized volume holographic grating may effectively weaken the side lobe of the angular spectral curve of the volume holographic grating, improve the waveguide efficiency and signal-to-noise ratio, and reduce energy waste.

Optionally, each of the volume holographic gratings is configured to have a uniformly distributed amplitude of refractive index modulation.

Optionally, each of the volume holographic gratings is configured to have the following refractive index modulation distribution n(x,z):

$$n(x,z)=n_0+n_1 \cdot \cos[|K|(x \sin \phi + z \cos \phi)],$$

wherein x is a coordinate along the direction of a surface of the volume holographic grating, z is a coordinate along a thickness direction of the volume holographic grating, $n_0$ is an average refractive index of material of the volume holographic grating, $n_1$ is an amplitude of refractive index modulation of the volume holographic grating, $\phi$ is an inclination angle of the volume holographic grating, $K$ is a grating vector of the volume holographic grating determined according to Bragg condition, and the equal refractive index fringe surface is perpendicular to the grating vector $K$.

According to the present application, the reflection efficiency or diffraction deflection efficiency of the grating is set through the uniformly distributed amplitude of refractive index modulation and the periodic refractive index modulation inside the grating to realize the control of the light field, such that the volume holographic grating may realize the semi-reflective and semi-transparent function, simple and flexible design, and easy processing.

Optionally, the optical waveguide includes a plurality of the volume holographic gratings with the same grating vector $K$, and wherein the plurality of the volume holographic gratings have different thicknesses and/or the plurality of the volume holographic gratings have different amplitudes of refractive index modulation.

According to the present application, the reflection efficiency or diffraction deflection efficiency and diffraction bandwidth or reflection bandwidth of the volume holographic grating may be adjusted by setting the amplitude of refractive index modulation and thickness, and the design is simple.

Optionally, the grating is constructed as a sub-wavelength grating.

According to the present application, the semi-reflective and semi-transparent optical effect may be realized by using the sub-wavelength grating structure, which is simple and flexible in design and easy to process.

A second aspect of the present application provides a display device including an optical machine for emitting light beam and the optical waveguide of the aforesaid technical solution, and wherein the light beam emitted by the optical machine is used as incident light of the optical waveguide.

According to the present application, the optical waveguide of the display device includes at least one grating disposed in the waveguide substrate, which may transmit and reflect incident light or transmit and diffractively deflect incident light, thereby realizing the semi-reflective and semi-transparent optical function, simple and flexible design, and easy processing. Wherein the reflected light or diffractive light is used for human observation, and the reflected light or diffractive light may be made to have higher brightness by setting a smaller incidence angle to improve user experience.

Optionally, the display device further includes a reflector for reflecting the light beam emitted by the optical machine and causing the light beam reflected by the reflector to propagate within the waveguide substrate through total internal reflection.

According to the present application, the reflector may increase the flexibility of the optical machine setting.

Optionally, the display device is a near-eye display device and further includes a lens including the optical waveguide and a frame for holding the lens close to eyes.

Optionally, the display device is an augmented reality display device or a virtual reality display device.

The optical waveguide according to the present application may be used, for example, for AR glasses.

Optionally, the display device is an optical pupil expansion device.

The optical waveguide according to the present application may be used, for example, for a pupil expansion device.

BRIEF DESCRIPTION OF THE DRAWINGS

The following drawings are hereby incorporated as part of the present application for the understanding of the present application. The embodiments of the present application are illustrated and described in the drawings in order to explain the principles of the present application. In the drawings:

FIGS. 7(a) and 7(b) show a schematic diagram of an optical path of the incident light passing through the grating of the optical waveguide as shown in FIG. 1, wherein FIG. 7(a) is an optical path when the incident light is incident on the grating at a small angle, and FIG. 7(b) is an optical path when the incident light is incident on the grating at a large angle;

FIGS. 8(a) and 8(b) show a schematic diagram of an optical path of the incident light passing through the grating of the optical waveguide as shown in FIG. 2, wherein FIG. 8(a) is an optical path when the incident light is incident on the grating at a small angle, and FIG. 8(b) is an optical path when the incident light is incident on the grating at a large angle;

FIGS. 9(a) and 9(b) show a schematic diagram of a sub-wavelength grating structure, wherein FIG. 9(a) is a schematic diagram of a longitudinal section of the sub-wavelength grating structure, and FIG. 9(b) is a schematic diagram of a cross section of the sub-wavelength grating structure;

EXPLANATION OF REFERENCE NUMERALS

100/200: Optical waveguide
210/220: Display device
300: Near-eye display device
10/110: Waveguide substrate
11/111: First surface
12/112: Second surface
20/120: Grating
21/121: Equal refractive index fringe surface
310: Lens
320: Frame
30/330: Optical machine
40: Reflector
50: Sub-wavelength grating
51: Two-dimensional hole structure

DETAILED DESCRIPTION

In the following description, numerous specific details are set forth in order to provide a more thorough understanding of the present application. However, it is obvious to those skilled in the art that the present application may be implemented without one or more of these details. Some technical features well-known in the art are not described in other examples in order to avoid confusion with the present application.

In order to thoroughly understand the present application, a detailed description will be provided in the following description. It should be understood that these embodiments are provided so that this disclosure will be thorough and complete, and fully convey the concept of these exemplary embodiments to those of ordinary skill in the art. Obviously, the implementation of the embodiments of the present application is not limited to the specific details familiar to those skilled in the art. The preferred embodiments of the present application are described in detail as follows. However, in addition to these detailed descriptions, the present application may have other embodiments.

Ordinals such as "first" and "second" recited in the present application are merely identifiers but do not have any other meaning, such as a specific order and the like. Moreover, for example, the term "first component" itself does not imply an existence of "second component", and the term "second component" itself does not imply an existence of "first component." The use of the words "first", "second" and "third" does not indicate any order, and these words may be construed as names.

It should be noted that the terms "up", "down", "front", "back", "left", "right", "inside", "outside" and similar expressions used herein are for illustrative purposes only and are not restrictive.

The first aspect of the present application provides an optical waveguide, which realizes the semi-reflective and semi-transparent functions of a multilayer film mirror surface through a grating, and which is simple and flexible in design, and easy to process.

Now, the exemplary embodiments of the present application will be described in more detail with reference to the accompanying drawings.

Figure 1:
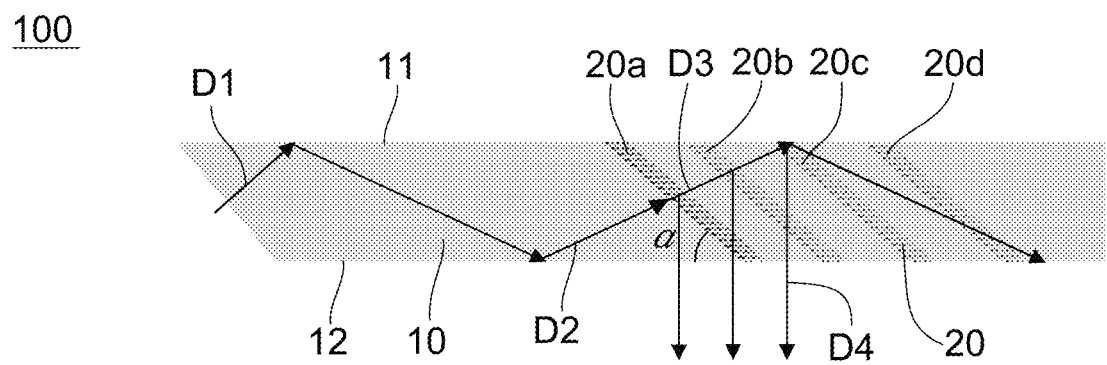
FIG. 1 shows a schematic diagram of an optical waveguide according to a first embodiment of the present application.

As shown in FIG. 1, an optical waveguide 100 according to a first embodiment of the present application includes a waveguide substrate 10 and at least one grating 20. The waveguide substrate 10 has a first surface 11 and a second surface 12 which are oppositely disposed and used to totally reflect the light D1 entering the inside of the waveguide substrate 10 and cause the light D1 to propagate within the waveguide substrate 10 through total internal reflection. For example, the light D2 is formed by total reflection of the light D1. The grating 20 is disposed in the waveguide substrate 10. The grating 20 is located between the first surface 11 and the second surface 12, and is inclined with respect to the first surface 11 and the second surface 12 for transmitting and reflecting the light D2 (i.e., D2 or D1 is the incident light of the grating 20). Wherein the transmitted light D3 is coupled into the waveguide substrate 10 to propagate within the waveguide substrate 10 through total internal reflection, and the reflected light D4 is coupled out from the waveguide substrate 10 so as to be received by human eyes.

Therefore, when the optical waveguide 100 includes a plurality of gratings 20 (for example, the optical waveguide 100 includes gratings 20a, 20b, 20c and 20d disposed in sequence according to the direction of an optical path) arranged in sequence according to the direction of the optical path, the transmitted light (or the light after total reflection) of the previous grating 20 becomes the incident light of the next grating 20, and the reflected light D4 of each grating 20 is coupled out from the waveguide substrate 10.

Figure 3:
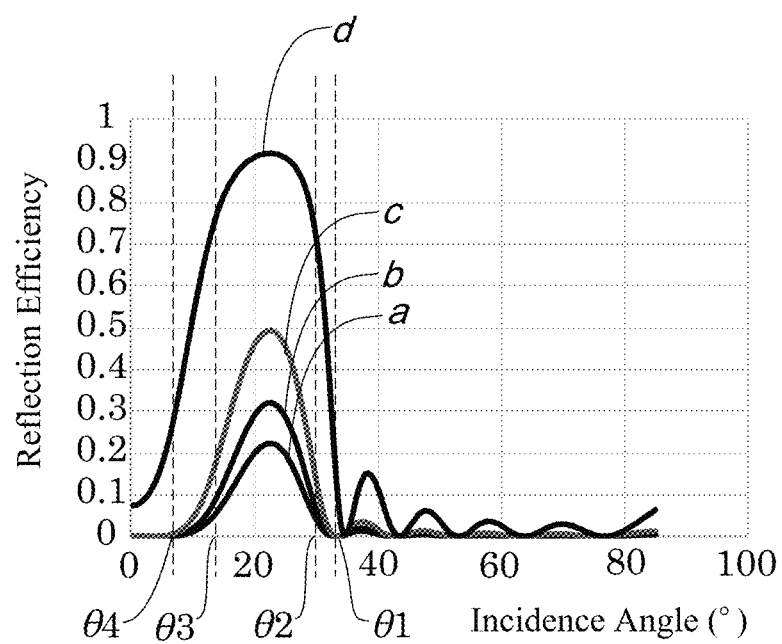
FIG. 3 shows a schematic diagram of the relationship between the reflection efficiency and the incidence angle of a grating of the optical waveguide as shown in FIG. 1, wherein curve a is the relation curve between the reflection efficiency and the incidence angle of a grating 20a, curve b is the relation curve between the reflection efficiency and the incidence angle of a grating 20b, curve c is the relation curve between the reflection efficiency and the incidence angle of a grating 20c, and curve d is the relation curve between the reflection efficiency and the incidence angle of a grating 20d.

The relationship between the reflection efficiency $\eta_R$ and the incidence angle $\theta$ of the grating 20 of the first embodiment is shown in FIG. 3, wherein the images of the relationship between the reflection efficiency $\eta_R$ and the incidence angle $\theta$ of the gratings 20a, 20b, 20c and 20d are curves a, b, c and d, respectively. The grating 20 is configured such that when the incidence angles $\theta$ of the incident light D2 on the grating 20 are different, the reflection efficiencies $\eta_R$ of the grating 20 are different. The reflection efficiency $\eta_R$ when the incidence angle $\theta$ is less than a first angle $\theta 1$ and greater than a fourth angle $\theta 4$ is greater than the reflection efficiency $\eta_R$ when the incidence angle $\theta$ greater than the first angle $\theta 1$. Wherein the first angle $\theta 1$ is greater than the fourth angle $\theta 4$.

Figure 2:
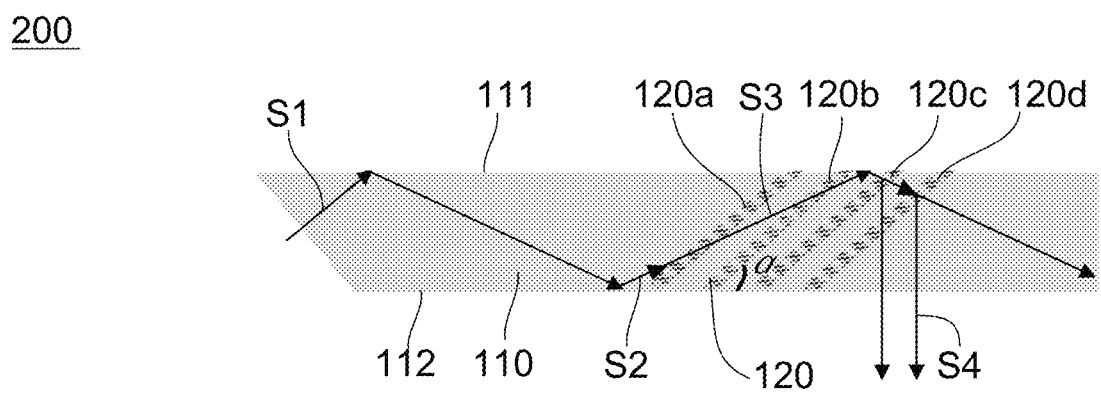
FIG. 2 shows a schematic diagram of an optical waveguide according to a second embodiment of the present application.

As shown in FIG. 2, an optical waveguide 200 according to a second embodiment of the present application includes a waveguide substrate 110 and at least one grating 120. The waveguide substrate 110 has a first surface 111 and a second surface 112 which are oppositely disposed and used to totally reflect the light S1 (for example, the light S2 is formed by total reflection of the light S1) entering the inside of the waveguide substrate 110 and cause the light S1 to propagate within the waveguide substrate 110 through total internal reflection. The grating 120 is disposed in the waveguide substrate 110. The grating 120 is located between the first surface 111 and the second surface 112, and is inclined with respect to the first surface 111 and the second surface 112 for transmitting and diffracting incident the light S2 (i.e., S2 or S1 is the incident light of the grating 120). Wherein the transmitted light S3 is coupled into the waveguide substrate 110 to propagate within the waveguide substrate 110 through total internal reflection, and the diffractively deflected light S4 is coupled out from the waveguide substrate 110 so as to be received by human eyes.

Therefore, when the optical waveguide 200 includes a plurality of gratings 120 (for example, the optical waveguide 200 includes gratings 120a, 120b, 120c and 120d disposed in sequence according to the direction of an optical path), arranged in sequence according to the direction of the optical path, the transmitted light (or the light after total reflection) of the previous grating 120 becomes the incident light of the next grating 120, and the diffractively deflected light S4 of each grating 120 is coupled out from the waveguide substrate 110.

Figure 4:
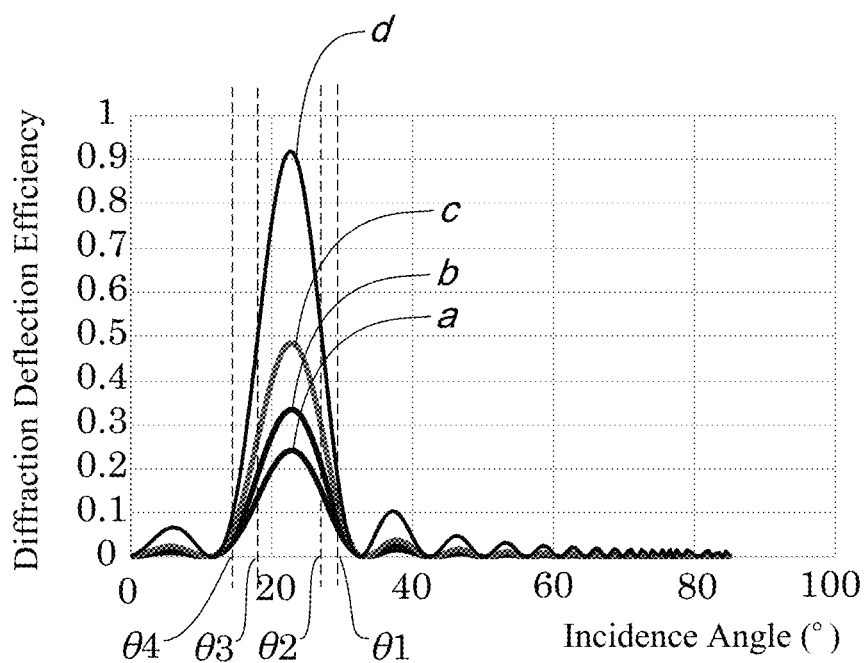
FIG. 4 shows a schematic diagram of the relationship between the diffraction deflection efficiency and the incidence angle of a grating of the optical waveguide as shown in FIG. 2, wherein curve a is the relation curve between the diffraction deflection efficiency and the incidence angle of a grating 120a, curve b is the relation curve between the diffraction deflection efficiency and the incidence angle of a grating 120b, curve c is the relation curve between the diffraction deflection efficiency and the incidence angle of a grating 120c, and curve d is the relation curve between the diffraction deflection efficiency and the incidence angle of a grating 120d.

The relationship between the diffraction deflection efficiency $\eta_T$ and the incidence angle $\theta$ of the grating 120 of the second embodiment is shown in FIG. 4, wherein the images of the relationship between the diffraction deflection efficiency $\eta_T$ and the incidence angle $\theta$ of gratings 120a, 120b, 120c and 120d are curves a, b, c and d, respectively. The grating 120 is configured such that when the incidence angles $\theta$ of the incident light S2 on the grating 120 are different, the diffraction deflection efficiencies $\eta_T$ of the grating 120 are different. The diffraction deflection efficiency $\eta_T$ when the incidence angle $\theta$ is less than the first angle $\theta 1$ and greater than the fourth angle $\theta 4$ is greater than the diffraction deflection efficiency $\eta_T$ when the incidence angle $\theta$ is greater than the first angle $\theta 1$. Wherein the first angle $\theta 1$ is greater than the fourth angle $\theta 4$.

Optionally, as shown in FIG. 3, the grating 20 is configured such that the reflection efficiency $\eta_R$ when the incidence angle $\theta$ is less than or equal to the second angle $\theta 2$ and greater than or equal to the third angle $\theta 3$ is more than three times the reflection efficiency $\eta_R$ when the incidence angle $\theta$ is greater than the first angle $\theta 1$. Wherein the second angle $\theta 2$ is less than or equal to the first angle $\theta 1$ and greater than the fourth angle $\theta 4$, and the third angle $\theta 3$ is less than the second angle $\theta 2$ and greater than or equal to the fourth angle $\theta 4$.

Therefore, when the incidence angle $\theta$ of the incident light D2 on the grating 20 is less than or equal to the second angle $\theta 2$ and greater than or equal to the third angle $\theta 3$, the reflection efficiency $\eta_R$ is significantly higher than the reflection efficiency $\eta_R$ when the incidence angle $\theta$ is in other ranges.

Optionally, as shown in FIG. 4, the grating 120 is configured such that the diffraction deflection efficiency $\eta_T$ when the incidence angle $\theta$ is less than or equal to the second angle $\theta 2$ and greater than or equal to the third angle $\theta 3$ is more than three times the diffraction deflection efficiency $\eta_T$ when the incidence angle $\theta$ is greater than the first angle $\theta 1$. Wherein the second angle $\theta 2$ is less than or equal to the first angle $\theta 1$ and greater than the fourth angle $\theta 4$, and the third angle $\theta 3$ is less than the second angle $\theta 2$ and greater than or equal to the fourth angle $\theta 4$.

Therefore, when the incidence angle $\theta$ of the incident light S2 on the grating 120 is less than or equal to the second angle $\theta 2$ and greater than or equal to the third angle $\theta 3$, the diffraction deflection efficiency $\eta_T$ is significantly higher than the diffraction deflection efficiency $\eta_T$ when the incidence angle $\theta$ is in other ranges.

Optionally, the grating 20/120 is configured such that when the incidence angle $\theta$ is less than or equal to the second angle $\theta 2$ and greater than or equal to the third angle $\theta 3$, a fluctuation coefficient s1 of the reflection efficiency $\eta_R$ of the grating 20 or of the diffraction deflection efficiency $\eta_T$ of the grating 120 is less than or equal to 0.33. Wherein the fluctuation coefficient s1 is calculated according to the following formula (1):

$$s1=(R_{max}-R_{min})/(R_{max}+R_{min}) \quad (1)$$

wherein $R_{max}$ is a maximum value of the reflection efficiency $\eta_R$ of the grating 20 when the incidence angle $\theta$ is less than or equal to the second angle $\theta 2$ and greater than or equal to the third angle $\theta 3$, $R_{min}$ is a minimum value of the reflection efficiency $\eta_R$ of the grating 20 when the incidence angle $\theta$ is less than or equal to the second angle $\theta 2$ and greater than or equal to the third angle $\theta 3$, or $R_{max}$ is a maximum value of the diffraction deflection efficiency $\eta_T$ of the grating 120 when the incidence angle $\theta$ is less than or equal to the second angle $\theta 2$ and greater than or equal to the third angle $\theta 3$, and $R_{min}$ is a minimum value of the diffraction deflection efficiency $\eta_T$ of the grating 120 when the incidence angle $\theta$ is less than or equal to the second angle $\theta 2$ and greater than or equal to the third angle $\theta 3$.

Therefore, when the incidence angle $\theta$ of the incident light on the grating is less than or equal to the second angle $\theta 2$ and greater than or equal to the third angle $\theta 3$, the value of the reflection efficiency $\eta_R$ or of the diffraction deflection efficiency $\eta_T$ is relatively uniform.

In the present application, the difference between the third angle $\theta 3$ and the second angle $\theta 2$ is greater than 10°. For example, it may be 13° to 15°.

Optionally, as shown in FIGS. 3 and 4, the first angle $\theta 1$ is 30° to 35°.

Optionally, the optical waveguide 100 includes a plurality of gratings 20. The optical waveguide 200 includes a plurality of gratings 120.

Further optionally, the plurality of gratings 20/120 are substantially parallel to each other and/or distributed at substantially equal intervals.

Optionally, the number of the gratings 20/120 is N (N is an integer greater than 1), and the N gratings 20/120 are numbered sequentially according to the direction of the optical path. The reflection efficiency $\eta_R$ of the grating 20 with the subsequent number is greater than the reflection efficiency $\eta_R$ of the grating 20 with the previous number, or the diffraction deflection efficiency $\eta_T$ of the grating 120 with the subsequent number is greater than the diffraction deflection efficiency $\eta_T$ of the grating 120 with the previous number.

As shown in FIG. 1, the number of the grating 20 is set to four, including gratings 20a, 20b, 20c and 20d. As shown in FIG. 3, the reflection efficiencies $\eta_R$ of the gratings 20a, 20b, 20c and 20d increase sequentially.

As shown in FIG. 2, the number of the gratings 120 is set to four, including gratings 120a, 120b, 120c and 120d. As shown in FIG. 4, the diffraction deflection efficiencies $\eta_T$ of the gratings 120a, 120b, 120c and 120d increase sequentially.

Further, the $k^{th}$ grating 20 has reflection efficiency $R_k$ and transmission efficiency $T_k$, or the $k^{th}$ grating 120 has diffraction deflection efficiency $R_k$ and transmission efficiency $T_k$ (k is an integer greater than or equal to 1 and less than or equal to N). Each of the gratings 20/120 has respective efficiency coefficient s2, wherein the efficiency coefficient $s2_i$ of light beam reaching the $i^{th}$ grating 20/120 is calculated according to the following formula (2):

$$s2_i = R_i \prod_{j=1}^{i-1} T_j \quad (2)$$

wherein i is an integer greater than 1 and less than or equal to N, j is an integer, and the efficiency coefficient $s2_1$ of the first grating 20a/120a is its reflection efficiency or diffraction deflection efficiency $R_1$.

In order to make the emitted light intensities of the plurality of gratings 20/120 uniform, Optionally, the optical waveguide 100/200 is configured such that a quotient of the difference between the maximum and minimum values of the N efficiency coefficients s2 divided by the sum of the maximum and minimum values of the N efficiency coefficients s2 is less than or equal to 0.33.

For example, if the transmission efficiencies and reflection efficiencies of the gratings 20a, 20b, 20c and 20d are respectively $T_1$, $T_2$, $T_3$ and $T_4$, and $R_1$, $R_2$, $R_3$ and $R_4$ when the light is incident at a small angle (e.g., less than or equal to the second angle θ2 and greater than or equal to the third angle θ3), the proportion of light energy (efficiency coefficient) $s2_i$ of a single ray reflected by the grating 20a, 20b, 20c and 20d is $R_1$, $T_1 \cdot R_2$, $T_1 \cdot T_2 \cdot R_3$ and $T_1 \cdot T_2 \cdot T_3 \cdot R_4$, respectively. The closer these four values are, the more uniform the energy of the light received by human eyes. The preferred values of $R_1$, $R_2$, $R_3$ and $R_4$ may be obtained by calculation.

Similarly, if the transmission efficiencies and diffraction deflection efficiencies of the gratings 120a, 120b, 120c, and 120d are respectively $T_1$, $T_2$, $T_3$ and $T_4$, and $R_1$, $R_2$, $R_3$ and $R_4$, when the light is incident at a small angle (e.g., less than or equal to the second angle θ2 and greater than or equal to the third angle θ3), the proportion of light energy (efficiency coefficient) $s2_i$ of a single ray reflected by the grating 120a, 120b, 120c and 120d is $R_1$, $T_1 \cdot R_2$, $T_1 \cdot T_2 \cdot R_3$ and $T_1 \cdot T_2 \cdot T_3 \cdot R_4$, respectively. The closer these four values are, the more uniform the energy of the light received by human eyes. The preferred values of $R_1$, $R_2$, $R_3$ and $R_4$ may be obtained by calculation.

Figure 5:
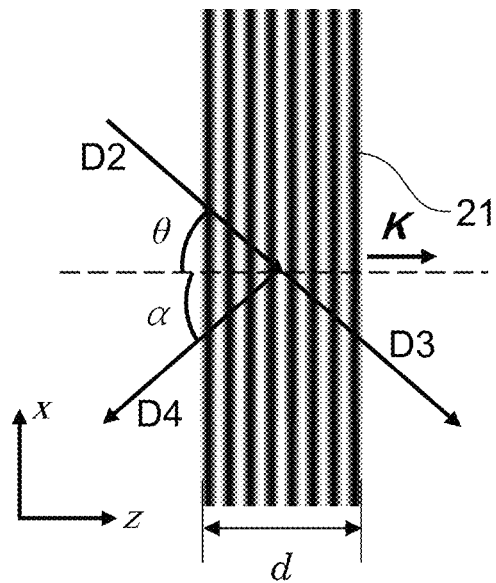
FIG. 5 shows a schematic diagram of the relationship between the equal refractive index fringe surface of the grating and the thickness direction of the grating of the optical waveguide as shown in FIG. 1.
Figure 6:
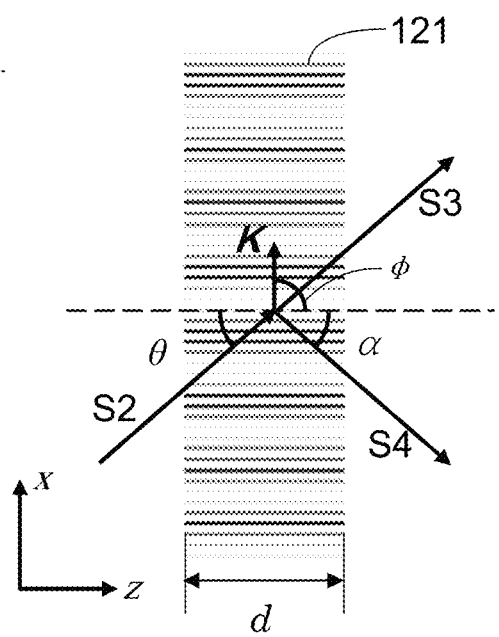
FIG. 6 shows a schematic diagram of the relationship between the equal refractive index fringe surface of the grating and the thickness direction of the grating of the optical waveguide as shown in FIG. 2.

Optionally, the grating 20/120 is constructed as a volume holographic grating. As shown in FIGS. 5 and 6, the volume holographic grating has an equal refractive index fringe surface 21/121, wherein a reflecting mirror surface is the equal refractive index fringe surface 21/121. Therefore, the control of the light field may be realized through the periodic refractive index modulation inside the volume holographic grating.

In the present application, as shown in FIG. 1, in the embodiment where the reflected light of the grating 20 is coupled out from the waveguide substrate 10, the grating 20 is referred to as a reflective volume holographic grating 20. As shown in FIG. 2, in the embodiment where the diffracted light of the grating 120 is coupled out from the waveguide substrate 110, the grating 120 is referred to as a transmissive volume holographic grating 120.

The key parameters of the volume holographic grating 20/120 include period Λ, inclination angle ϕ, thickness d, and amplitude of refractive index modulation $n_1$, which need to satisfy the Bragg reproduction condition $2\Lambda \cos(\phi-\theta)=m$. Wherein the inclination angle ϕ is the included angle between the grating thickness direction z (see FIGS. 5 and 6) and the grating vector K, the period κ and the inclination angle ϕ mainly determine the diffraction direction of the light beam, while the thickness d and the amplitude of refractive index modulation $n_1$ mainly affect the diffraction deflection efficiency $\eta_T$ (or reflection efficiency $\eta_R$) and the diffraction bandwidth (or reflection bandwidth).

For the reflective volume holographic grating 20, according to the Kogelnik coupled wave theory, the reflection efficiency $\eta_R$ may be calculated according to formula (3) under the Bragg condition:

$$\eta_R = \tan^2 v \quad (3)$$

wherein v is the coupling strength.

In the first embodiment, the product of the amplitude of refractive index modulation $n_1$ and the thickness d determines the reflection efficiency $\eta_R$ under the Bragg condition, and the reflection efficiency $\eta_R$ changes periodically with the product. The smaller the thickness d is, the wider the angular spectrum width is. In the case of the same thickness d, the reflection efficiency $\eta_R$ may be adjusted by adjusting $n_1$.

For the transmissive volume holographic grating 120, according to the Kogelnik coupled wave theory, the diffraction deflection efficiency $\eta_T$ may be calculated according to formula (4) under the Bragg condition:

$$\eta_T = \sin^2 v \quad (4)$$

wherein v is the coupling strength.

In the second embodiment, the product of the amplitude of refractive index modulation $n_1$ and the thickness d determines the diffraction deflection efficiency $\eta_T$ under the Bragg condition, and the diffraction deflection efficiency $\eta_T$ changes periodically with the product. The smaller the thickness d is, the wider the angular spectrum width is. In the case of the same thickness d, the diffraction deflection efficiency $\eta_T$ may be adjusted by adjusting $n_1$.

Optionally, the volume holographic grating 20/120 has a thickness d of 1 to 20 microns, and/or the volume holographic grating 20/120 has an amplitude of refractive index modulation $n_1$ of 0.01 to 0.2.

Optionally, the included angle between the volume holographic grating 20 and the first surface 11 or the second surface 12 is 20° to 30°, and/or the volume holographic grating 20 has a grating period A of 2000 to 7000 lp/mm.

Optionally, the included angle between the volume holographic grating 120 and the first surface 111 or the second surface 112 is 20° to 30°, and/or the volume holographic grating 120 has a grating period A of 2000 to 7000 lp/mm.

Optionally, the thickness direction of the volume holographic grating 20 is perpendicular to the equal refractive index fringe surface 21. As shown in FIG. 5, the inclination angle φ is 0°.

Optionally, the thickness direction of the volume holographic grating 120 is parallel to the equal refractive index fringe surface 121. As shown in FIG. 6, the inclination angle φ is 90°.

In some embodiments, the thickness direction of the volume holographic grating 20 may not be perpendicular to the equal refractive index fringe surface 20. In some embodiments, the thickness direction of the volume holographic grating 120 may not be parallel to the equal refractive index fringe surface 121.

Optionally, the volume holographic grating 20/120 includes a photosensitive material with an average refractive index $n_0$ of 1.5 to 2.0. The photosensitive material may be selected from, for example, photopolymer, polymer dispersed liquid crystal (PDLC), and the like. In the case of the same optical-mechanical FOV, the selection of a waveguide material with larger refractive index is beneficial to improve the efficiency uniformity in the field of view. Due to the existence of the refraction effect, within the same angular variation range (FOVout) of the light D1 or S1, the larger the waveguide refractive index is, the smaller the angle range of the incidence angle (FOVin) corresponding to the grating 20/120 in the waveguide is. That is, it is beneficial to realize the condition that the incidence angle θ of the grating 20/120 is less than the first angle θ1 and greater than the fourth angle θ4.

Optionally, each of the volume holographic gratings 20/120 may be configured to have a non-uniformly distributed amplitude of refractive index modulation $n_1$.

Further, each of the volume holographic gratings 20/120 is configured such that the amplitude of refractive index modulation $n_1$ at both ends is less than that in the middle part.

Further, the volume holographic grating 20/120 is constructed as an apodized volume holographic grating.

Optionally, each of the volume holographic gratings 20/120 is configured to have the refractive index modulation distribution n(x,z) calculated according to the following formula (5):

$$n(x,z)=n_0+n_1(x,z)\cdot\cos[|K\equiv(x\sin\phi+z\cos\phi)] \quad (5)$$

wherein the value of $n_1$ is sinc-shaped apodization, which is calculated as formula (6):

$$n_1(x,z)=n_m\cdot\sin c[2(z-d/2)/d] \quad (6)$$

or, the value of $n_1$ is Gaussian-shaped apodization, which is calculated as formula (7):

$$n_1(x,z)=n_m\cdot\exp[-(z-d/2)^2] \quad (7)$$

wherein x is a coordinate along the direction of a surface of the volume holographic grating 20/120, z is a coordinate along a thickness direction of the volume holographic grating 20/120, $n_0$ is an average refractive index of material of the volume 30 holographic grating 20/120, nm is a preset constant, φ is an inclination angle of the volume holographic grating 20/120, $K$ is a grating vector of the volume holographic grating 20/120 determined according to the Bragg condition, and the equal refractive index fringe surface is perpendicular to the grating vector $K$.

Figure 7A:
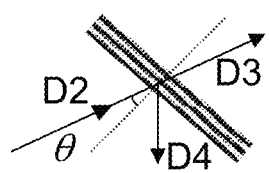
Figure 7B:
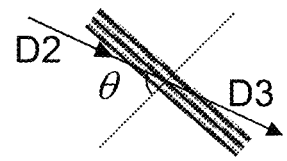

Therefore, the optical path of the incident light D2 passing through the reflective volume holographic grating 20 configured as an apodized volume holographic grating is shown in FIGS. 7(a) and 7(b). As shown in FIG. 7(a), when incident at a small angle (e.g., less than or equal to the second angle θ2 and greater than or equal to the third angle θ3), part of the light D4 is coupled out from the waveguide substrate 10 after being reflected by the grating 20, and part of the light D3 is incident on the next grating 20 after being transmitted by the grating 20. As shown in FIG. 7(b), when incident at a large angle (e.g., greater than the second angle θ2), the transmittance of the grating 20 to the incident light D2 is high, which reduces reflected stray light, and may improve waveguide efficiency and signal-to-noise ratio.

Figure 8A:
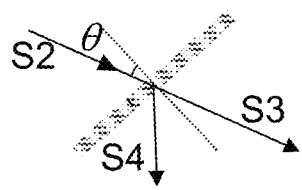
Figure 8B:
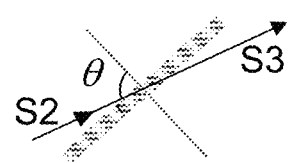

The optical path of the incident light S2 passing through the transmissive volume holographic grating 120 configured as an apodized volume holographic grating is shown in FIGS. 8(a) and 8(b). When incident at a small angle (e.g., less than or equal to the second angle θ2 and greater than or equal to the third angle θ3), part of the light S4 is coupled out from the waveguide substrate 110 after being diffractively deflected by the grating 120, and part of the light S3 is incident on the next grating 120 after being transmitted by the grating 120 or totally reflected within the waveguide substrate 110 (as shown in FIG. 8(a)). When incident at a large angle (e.g., greater than the second angle θ2), the transmittance of the grating 120 to the incident light S2 is high (as shown in FIG. 8(b)), which reduces diffracted stray light, and may improve waveguide efficiency and signal-to-noise ratio.

Optionally, each of the volume holographic gratings 20/120 may also be configured to have a uniformly distributed amplitude of refractive index modulation $n_1$.

Further, each of the volume holographic gratings 20/120 is configured to have the refractive index modulation distribution n(x,z) of the following formula (8):

$$n(x,z)=n_0+n_1\cdot\cos[K|(x\sin\phi+z\cos\phi)] \quad (8)$$

wherein x is a coordinate along the direction of a surface of the volume holographic grating 20/120, z is a coordinate along a thickness direction of the volume holographic grating 20/120, $n_0$ is an average refractive index of material of the volume holographic grating 20/120, $n_1$ is an amplitude of refractive index modulation of the volume holographic grating 20/120, φ is an inclination angle of the volume holographic grating 20/120, $K$ is a grating vector of the volume holographic grating 20/120. The grating vector $K$ is determined according to the Bragg condition, and the equal refractive index fringe surface is perpendicular to the grating vector $K$.

Optionally, the optical waveguide 100 includes a plurality of the volume holographic gratings 20/120 with the same grating vector $K$, wherein the plurality of the volume holographic gratings 20/120 have different thicknesses d and/or have different amplitudes of refractive index modulation $n_1$ so as to improve the consistency of reflection efficiency (or diffraction deflection efficiency) within the target angle range.

When the working wavelength (incident light wavelength) λ and the angle of incident light are determined, the period A and the inclination angle θ of the volume holographic grating 20/120 may be determined according to the K-vector circle method.

For example, Table 1 gives a specific example of the relevant parameters of the optical waveguide 100 including the reflective volume holographic grating 20 according to the above. Wherein the incidence angle of light D1 entering the waveguide substrate 10 on the first surface 11 of the waveguide substrate 10 is 45°, the included angle α between the grating 20 and the second surface 12 of the waveguide substrate 10 is set to 22.5°, and the number of the grating 20 is set to four.

Table 1 Example table of parameters of reflective volume holographic grating 20

| Parameters of reflective volume holographic grating | 20a | 20b | 20c | 20d |
|---|---|---|---|---|
| Inclination angle ($\phi$) | 0° | 0° | 0° | 0° |
| Period ($\Lambda$) | 2455 lp/mm | 2455 lp/mm | 2455 lp/mm | 2455 lp/mm |
| Thickness (d) | 2 μm | 2 μm | 2 μm | 2 μm |
| Amplitude of refractive index modulation ($n_1$) | 0.04 | 0.048 | 0.06 | 0.1 |
| Average refractive index ($n_0$) | 1.7 | 1.7 | 1.7 | 1.7 |
| Incident light wavelength ($\lambda$) | 530 nm | 530 nm | 530 nm | 530 nm |
| Included angle ($\alpha$) | 22.5° | 22.5° | 22.5° | 22.5° |
| Maximum reflection efficiency | 0.223 | 0.320 | 0.494 | 0.918 |
| Incidence angle corresponding to the maximum reflection efficiency | 22.5° | 22.5° | 22.5° | 22.5° |

In the embodiment shown in Table 1, the wavelength of the incident light is 530 nm, the reflective volume holographic grating 20 is configured such that the thickness direction is perpendicular to the equal refractive index fringe surface, the thickness d is 2 μm, and the period is 2455 lp/mm. The gratings 20a, 20b, 20c and 20d have the amplitudes of refractive index modulation $n_1$ of 0.04, 0.048, 0.06 and 0.1, respectively. The gratings 20a, 20b, 20c and 20d all have the maximum reflection efficiency when the incident light has an angle of 22.5°, and the maximum reflection efficiency increases sequentially.

As another example, Table 2 shows the parameters of a specific example of an optical waveguide 200 including the transmissive volume holographic grating 120. Wherein the incidence angle of light S1 entering the waveguide substrate 110 on the first surface 111 of the waveguide substrate 110 is 45°, the included angle α between the grating 120 and the second surface of the waveguide substrate is 22.5°, and the number of gratings 120 is set to four.

Table 2 Example table of parameters of transmissive volume holographic grating 120

| Parameters of transmissive volume holographic grating | 120a | 120b | 120c | 120d |
|---|---|---|---|---|
| Inclination angle ($\phi$) | 90° | 90° | 90° | 90° |
| Period ($\Lambda$) | 5927 lp/mm | 5927 lp/mm | 5927 lp/mm | 5927 lp/mm |
| Thickness (d) | 2 μm | 2 μm | 2 μm | 2 μm |
| Amplitude of refractive index modulation ($n_1$) | 0.04 | 0.05 | 0.068 | 0.15 |
| Average refractive index ($n_0$) | 1.7 | 1.7 | 1.7 | 1.7 |
| Incident light wavelength ($\lambda$) | 530 nm | 530 nm | 530 nm | 530 nm |
| Included angle ($\alpha$) | 22.5° | 22.5° | 22.5° | 22.5° |
| Maximum diffraction deflection efficiency | 0.241 | 0.334 | 0.485 | 0.920 |
| Incidence angle corresponding to the maximum diffraction deflection efficiency | 22.5° | 22.5° | 22.5° | 22.5° |

In the embodiment shown in Table 2, the wavelength of the incident light is 530 nm, the transmissive volume holographic grating 120 is configured such that the thickness direction is parallel to the equal refractive index fringe surface, the thickness d is 2 μm, and the period is 5927 lp/mm. The gratings 120a, 120b, 120c, and 120d have the amplitudes of refractive index modulation $n_1$ of 0.04, 0.05, 0.068 and 0.15, respectively. The gratings 120a, 120b, 120c and 120d all have the maximum diffraction deflection efficiency when the incident light has an angle of 22.5°, and the maximum diffraction deflection efficiency increases sequentially.

Figure 9A:
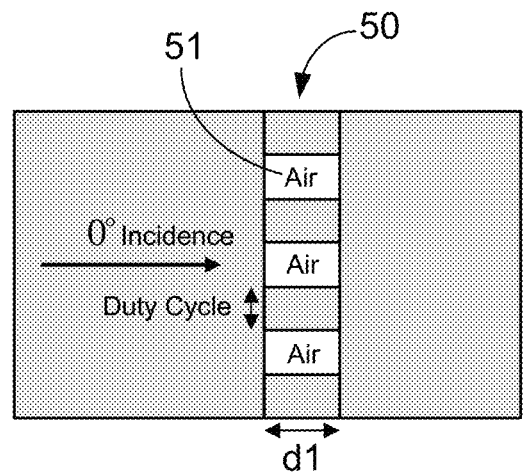
Figure 9B:
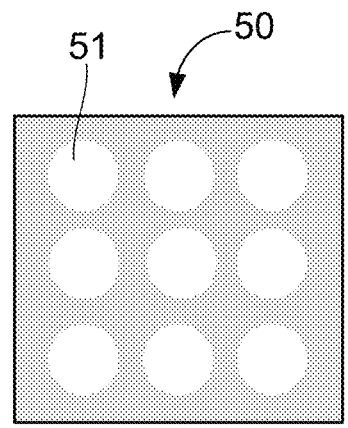

In another embodiment, the grating 20/120 may be constructed as a sub-wavelength grating 50. The reflection efficiency of the sub-wavelength grating may be controlled by adjusting the parameters such as the period, duty cycle, thickness, and refractive index of the material. As shown in FIGS. 9(a) and 9(b), the sub-wavelength grating 50 is configured, for example, with a one-dimensional or two-dimensional hole structure 51 (or a columnar structure), and the grating material may be a dielectric material or a metal material.

The optical waveguide of the present application may realize the semi-reflective and semi-transparent functions of the multilayer film mirror surface by the grating provided in the waveguide substrate, which is simple and flexible design, and easy to process. By setting the period, inclination angle, amplitude of refractive index modulation, and thickness parameters of the grating, the reflection efficiency and reflection bandwidth, or the diffraction efficiency and diffraction bandwidth of the grating may be adjusted to achieve the effect of less stray light, uniform energy distribution and large FOV.

On the other hand, the present application further provides a display device.

Figure 10:
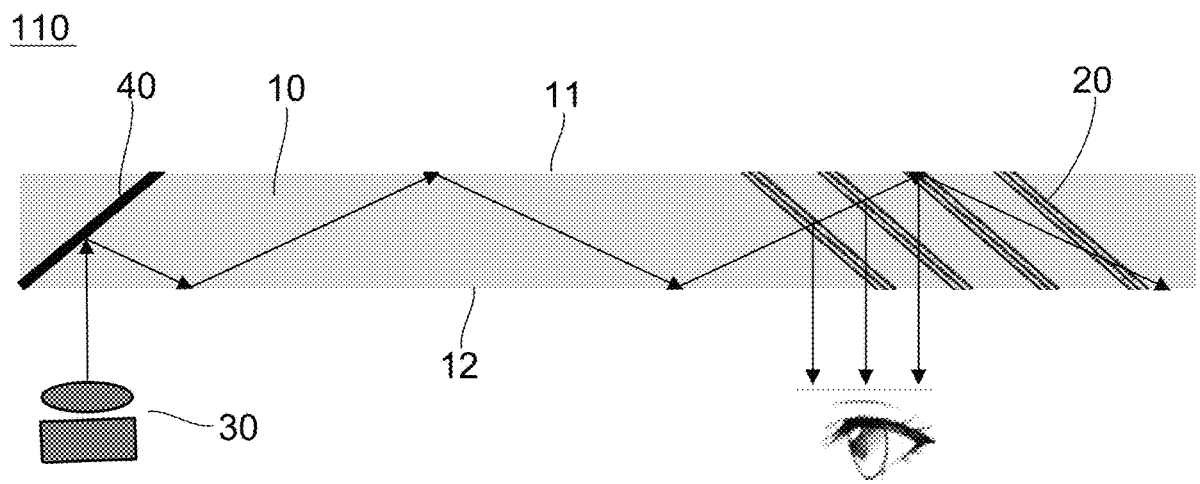
FIG. 10 shows a schematic diagram of a display device according to a first embodiment of the present application.

As shown in FIG. 10, in the first embodiment, a display device 110 includes an optical machine 30 and the optical waveguide 100 of the first embodiment described in the first aspect. Wherein the optical machine 30 is used for emitting light beam used as the incident light of the optical waveguide 100. Optionally, the optical machine 30 may project image light to the optical waveguide 100, and the light emitted by the optical machine 30 is visible light. The light (e.g., image light) projected by the optical machine 30 onto the optical waveguide 100 is coupled out from the waveguide substrate 10 and enters the eyes of viewer after total internal reflection of the waveguide substrate 10 and reflection of the grating 20, thereby enabling the viewer to see the image projected by the optical machine 30.

Figure 11:
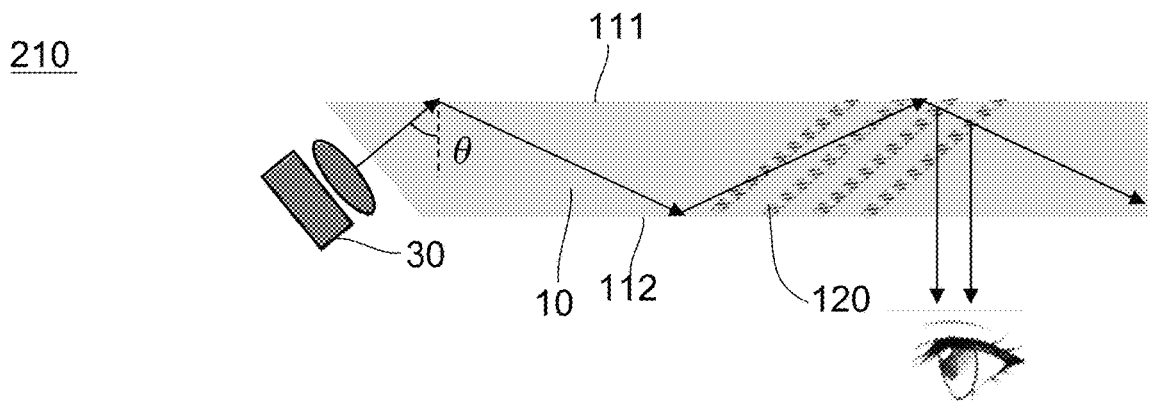
FIG. 11 shows a schematic diagram of a display device according to a second embodiment of the present application.

As shown in FIG. 11, in the second embodiment, a display device 210 includes an optical machine 30 and the optical waveguide 200 of the second embodiment described in the first aspect. Wherein the optical machine 30 is used for emitting light beam used as the incident light of the optical waveguide 200. Optionally, the optical machine 30 may project image light to the optical waveguide 200, and the light emitted by the optical machine 30 is visible light. The light (e.g., image light) projected by the optical machine 30 onto the optical waveguide 200 is coupled out from the waveguide substrate 10 and enters the eyes of viewer after total internal reflection of the waveguide substrate 10 and diffraction of the grating 120, thereby enabling the viewer to see the image projected by the optical machine 30.

Optionally, as shown in FIG. 10, the display device 110 further includes a reflector 40 for reflecting the light beam emitted by the optical machine 30 and causing the light beam reflected by the reflector 40 to propagate within the waveguide substrate 10 through total internal reflection. Other display devices provided in the present application may also include a reflector 40.

The display device provided in the present application may be any device including the aforementioned optical waveguide 100/200. For example, the display device is an augmented reality display device or a virtual reality display device, wherein the augmented reality display device includes but is not limited to the devices such as augmented reality (AR) glasses, an automotive head-up display (HUD), or the like. For example, the display device is an optical pupil expansion device.

Figure 12:
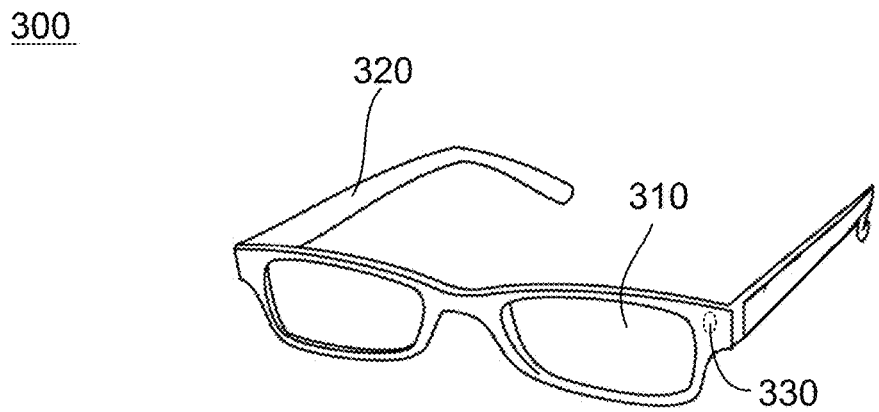
FIG. 12 is a schematic perspective view of a specific example of a display device according to the present application.

For example, as shown in FIG. 12, the display device may be a near-eye display device 300 that may include a lens 310 and a frame 320. Wherein the lens includes the optical waveguide 100/200 described in the first aspect, and the frame 320 is used to hold the lens 310 close to eyes. The optical machine 330 of the near-eye display device 300 may project an image onto the optical waveguide 100/200.

It should be understood that the display device according to the present application includes all features and effects of the optical waveguide according to the present application.

The processes and steps described above in all preferred embodiments are only examples. Unless an adverse effect occurs, the various processing operations may be performed in a different order than the one described above. The sequence of steps in the above processes may also be added, combined or subtracted according to actual needs.

In understanding the scope of the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words having similar meanings such as the terms, "including", "having" and their derivatives.

The term "attached" or "attaching" as used herein includes: configuration(s) in which an element is directly fixed to another element by fixing the element directly to another element; configuration(s) in which element is indirectly fixed to another element by fixing the element to an intermediate member(s) which in turn are fixed to another element; and configuration(s) in which one element is integral with another element, that is, one element is essentially a part of another element. This definition also applies to words having similar meanings such as "connected", "joined", "coupled", "mounted", "glued", and "fixed" and their derivatives. Finally, terms of degree such as "substantially", "about" and "approximately" as used herein mean an amount of deviation of the modified term such that the end result is not significantly changed.

Unless otherwise defined, the technical and scientific terms used herein have the same meanings as commonly understood by those skilled in the technical field of the present application. The terms used herein are only for the purpose of describing specific implementation, and are not intended to limit the present application. Feature(s) described in one embodiment herein may be applied to another embodiment alone or in combination with other feature(s), unless the feature(s) are not applicable in the other embodiment or otherwise stated.

The present application has been described through the above-mentioned embodiments, but it should be understood that the above-mentioned embodiments are only for the purpose of illustration and description, and are not intended to limit the present application to the scope of the described embodiments. Moreover, those skilled in the art could understand that the present application is not limited to the above-mentioned embodiments. More variations and modifications may also be made according to the teachings of the present application, and these variations and modifications fall within the protection scope claimed by the present application.

What is claimed is:

1. An optical waveguide, comprising:
 a waveguide substrate having a first surface and a second surface oppositely disposed for totally reflecting light entering the inside of the waveguide substrate and causing the light to propagate within the waveguide substrate through total internal reflection; and
 at least one grating disposed in the waveguide substrate and located between and inclined with respect to the first surface and the second surface for transmitting and reflecting incident light or for transmitting and diffractively deflecting incident light, wherein the transmitted light is coupled into the waveguide substrate to propagate within the waveguide substrate through total internal reflection, and the reflected or diffractively deflected light is coupled out from the waveguide substrate,
 wherein the grating is configured such that:
 when incidence angles of the incident light on the grating are different, reflection efficiencies or diffraction deflection efficiencies of the grating are different,
 the reflection efficiency when the incidence angle is less than a first angle and greater than a fourth angle is greater than the reflection efficiency when the incidence angle is greater than the first angle; or the diffraction deflection efficiency when the incidence angle is less than the first angle and greater than the fourth angle is greater than the diffraction deflection efficiency when the incidence angle is greater than the first angle, and
 wherein the first angle is greater than the fourth angle.

2. The optical waveguide of claim 1, wherein the grating is configured such that the reflection efficiency when the incidence angle is less than or equal to a second angle and greater than or equal to a third angle is more than three times the reflection efficiency when the incidence angle is greater than the first angle; or the diffraction deflection efficiency when the incident angle is less than or equal to the second angle and greater than or equal to the third angle is more than three times the diffraction deflection efficiency when the incidence angle is greater than the first angle, and wherein the second angle is less than or equal to the first angle and greater than the fourth angle, and the third angle is less than the second angle and greater than or equal to the fourth angle.

3. The optical waveguide of claim 2, wherein the grating is configured such that when the incidence angle is less than or equal to the second angle and greater than or equal to the third angle, a fluctuation coefficient s1 of the reflection efficiency or of the diffraction deflection efficiency is less than or equal to 0.33, wherein the fluctuation coefficient s1 is calculated according to the following formula:

$$s1=(R_{max}-R_{min})/(R_{max}+R_{min})$$

and wherein $R_{max}$ is a maximum value of the reflection efficiency when the incidence angle is less than or equal to the second angle and greater than or equal to the third angle, $R_{min}$ is a minimum value of the reflection efficiency when the incidence angle is less than or equal to the second angle and greater than or equal to the third angle; or $R_{max}$ is a maximum value of the diffraction deflection efficiency when the incidence angle is less than or equal to the second angle and greater than or equal to the third angle, and $R_{min}$ is a minimum value of the diffraction deflection efficiency when the incidence angle is less than or equal to the second angle and greater than or equal to the third angle.

4. The optical waveguide of claim 3, wherein the difference between the third angle and the second angle is greater than 10°.

5. The optical waveguide of claim 1, wherein the first angle is 30° to 35°.

6. The optical waveguide of claim 1, comprising a plurality of the gratings.

7. The optical waveguide of claim 6, wherein, the number of the gratings is N, and N is an integer greater than 1, the N gratings are numbered sequentially according to the direction of an optical path, and the reflection efficiency of the grating with the subsequent number is greater than the reflection efficiency of the grating with the previous number, or the diffraction deflection efficiency of the grating with the subsequent number is greater than the diffraction deflection efficiency of the grating with the previous number.

8. The optical waveguide of claim 7, wherein, a $k^{th}$ said grating has reflection efficiency $R_k$ and transmission efficiency $T_k$ or the $k^{th}$ said grating has diffraction deflection efficiency $R_k$ and transmission efficiency $T_k$, and k is an integer greater than or equal to 1 and less than or equal to N, each of the gratings has respective efficiency coefficient s2, wherein the efficiency coefficient $s2_i$ of light beam reaching an i said grating is calculated according to the following formula:

$$s2_i = R_i \prod_{j=1}^{i-1} T_j$$

wherein i is an integer greater than 1 and less than or equal to N, j is an integer, and the efficiency coefficient $s2_1$ of a first said grating is its reflection efficiency or diffraction deflection efficiency $R_1$, and the optical waveguide is configured such that a quotient of the difference between the maximum the minimum values of the N efficiency coefficients s2 divided by the sum of the maximum the minimum values of the N efficiency coefficients s2 is less than or equal to 0.33.

9. The optical waveguide of claim 6, wherein the plurality of the gratings are substantially parallel to each other and/or distributed at substantially equal intervals.

10. The optical waveguide of claim 1, wherein the grating is constructed as a volume holographic grating having an equal refractive index fringe surface, wherein a reflecting mirror surface is the equal refractive index fringe surface.

11. The optical waveguide of claim 10, wherein, the volume holographic grating has a thickness of 1 to 20 microns, and/or the volume holographic grating has an amplitude of refractive index modulation of 0.01 to 0.2.

12. The optical waveguide of claim 10, wherein, an included angle between the volume holographic grating and the first surface or the second surface is 20° to 30°, and/or the volume holographic grating has a grating period of 2000 to 7000 lp/mm.

13. The optical waveguide of claim 10, wherein, a thickness direction of the volume holographic grating is parallel to or perpendicular to the equal refractive index fringe surface, and/or the volume holographic grating includes a photosensitive material with an average refractive index of 1.5 to 2.0.

14. The optical waveguide of claim 10, wherein each of the volume holographic gratings is configured to have a nonuniformly distributed amplitude of refractive index modulation.

15. The optical waveguide of claim 14, wherein each of the volume holographic gratings is configured such that the amplitude of refractive index modulation at both ends is less than that in the middle part.

16. The optical waveguide of claim 15, wherein the volume holographic grating is constructed as an apodized volume holographic grating.

17. The optical waveguide of claim 16, wherein each of the volume holographic gratings is configured to have the following refractive index modulation distribution n(x,z):

$$n(x, z) = n_0 + n_1(x, z) \cdot \cos[|K|(x\sin\phi + z\cos\phi)], \text{ wherein,}$$

$$n_1(x, z) = n_m \cdot \text{sinc}[2(z - d/2)/d], \text{ or}$$

$$n_1(x, z) = n_m \cdot \exp[-(z - d/2)^2],$$

wherein x is a coordinate along the direction of a surface of the volume holographic grating, z is a coordinate along a thickness direction of the volume holographic grating, $n_0$ is an average refractive index of material of the volume holographic grating, $n_m$ is a preset constant, $\phi$ is an inclination angle of the volume holographic grating, $K$ is a grating vector of the volume holographic grating determined according to Bragg condition, and the equal refractive index fringe surface is perpendicular to the grating vector $K$.

18. The optical waveguide of claim 10, wherein each of the volume holographic gratings is configured to have a uniformly distributed amplitude of refractive index modulation.

19. The optical waveguide of claim 18, wherein each of the volume holographic gratings is configured to have the following refractive index modulation distribution n(x,z):

$$n(x,z)=n_0+n_1\cdot\cos[|\mathbf{K}|(x\sin\phi+z\cos\phi)],$$

wherein x is a coordinate along the direction of a surface of the volume holographic grating, z is a coordinate along a thickness direction of the volume holographic grating, $n_0$ is an average refractive index of material of the volume holographic grating, $n_1$ is an amplitude of refractive index modulation of the volume holographic grating, $\phi$ is an inclination angle of the volume holographic grating, $\mathbf{K}$ is a grating vector of the volume holographic grating determined according to Bragg condition, and the equal refractive index fringe surface is perpendicular to the grating vector $\mathbf{K}$.

20. The optical waveguide of claim 10, comprising a plurality of the volume holographic gratings with the same grating vector $\mathbf{K}$, wherein, the plurality of the volume holographic gratings have different thicknesses and/or the plurality of the volume holographic gratings have different amplitudes of refractive index modulation.

21. The optical waveguide of claim 1, wherein the grating is constructed as a sub-wavelength grating.

22. A display device, comprising:
an optical machine for emitting light beam; and
the optical waveguide of claim 1, wherein the light beam emitted by the optical machine is used as incident light of the optical waveguide.

23. The display device of claim 22, further comprising a reflector for reflecting the light beam emitted by the optical machine and causing the light beam reflected by the reflector to propagate within the waveguide substrate through total internal reflection.

24. The display device of claim 22, wherein the display device is a near-eye display device and further comprises:
a lens including the optical waveguide; and
a frame for holding the lens close to eyes.

25. The display device of claim 22, wherein the display device is an augmented reality display device or a virtual reality display device.

26. The display device of claim 22, wherein the display device is an optical pupil expansion device.

* * * * *

UNITED STATES PATENT AND TRADEMARK OFFICE
CERTIFICATE OF CORRECTION

PATENT NO. : 12,124,069 B1  
APPLICATION NO. : 18/666213  
DATED : October 22, 2024  
INVENTOR(S) : Peng Chen et al.

Page 1 of 1

It is certified that error appears in the above-identified patent and that said Letters Patent is hereby corrected as shown below:

In the Specification

In Column 10, Line 39, the phrase "greater than or 30 equal to" should read --greater than or equal to--.

In Column 12, Line 16, the formula "2Λcos(φ-θ)=m." should read --2Λcos(φ-θ)=mλ.--; Line 19, the phrase "the period k" should read --the period $\Lambda$--; Formula 3, that portion of the formula reading "tan$^2$" should read --tanh$^2$--; Line 60, the phrase "grating period A of 2000" should read --grating period $\Lambda$ of 2000--; and Line 65, the phrase "grating period A of 2000" should read --grating period $\Lambda$ of 2000--.

In Column 13, Formula 5, that portion of the formula reading "[|K" should read --[|K|--; Line 58, the phrase "the volume 30 holographic grating" should read --the volume holographic grating--; Line 59, the phrase reading "nm is a preset constant" should read --$n_m$ is a preset constant--.

In Column 14, Formula 8, that portion of the formula reading "[|K" should read --[|K|--; Line 59, the phrase reading "period A and the inclination angle Φ" should read --the period $\Lambda$ and the inclination angle $\varphi$--.

In the Claims

In Column 19, Line 58, the phrase "reaching an i" should read --reaching an $i^{th}$--.

Signed and Sealed this  
Twenty-eighth Day of January, 2025

Coke Morgan Stewart  
*Acting Director of the United States Patent and Trademark Office*